United States Patent Office 3,303,091
Patented Feb. 7, 1967

3,303,091
PESTICIDAL AEROSOL COMPOSITIONS
Norman G. Mailander and Louis M. Sesso, Racine, Wis.,
assignors to S. C. Johnson & Son, Inc., Racine, Wis.
No Drawing. Filed Sept. 10, 1964, Ser. No. 395,560
5 Claims. (Cl. 167—39)

The present application is a continuation-in-part of our U.S. application, Serial No. 170,241, filed January 31, 1962, now U.S. Patent 3,159,535.

This invention relates to emulsifier compositions suitable for use with pressurized, self-propellant compositions which produce atomized space sprays in which the discharged particles remain airborne for a substantial period of time. More particularly, this invention relates to pressurized, self-propellant compositions containing a stable, oil-out emulsion, separate liquid propellant having a specific gravity less than said emulsion wherein a portion of said liquid propellant comprises the continuous phase of said emulsion, gaseous propellant provided by volatilization of said liquid propellant and an emulsifier composition containing a polyethoxylated, long-chain fatty acid. When these self-propellant compositions are combined with various active ingredients, they function effectively as insecticides, fungicides, bactericides, miticides, insect repellants, space deodorants, decongestants and comparable products.

Pesticides, space deodorants and similar compositions are often provided in aerosol packages from which they are dispensed by spraying into the atmosphere. It is obvious that maximum effectiveness of such compositions is attained by maintaining the active ingredient airborne as long as possible. Thus, it is apparent that flying insects can best be controlled by pesticides in the atmosphere. Therefore, formulators of compositions of this nature endeavor to produce sprays in which the majority of the particles are of small diameter since the smaller the particle, the longer it is likely to remain suspended in air. As a general rule, formulators attempt to provide sprays in which 80 percent of the particles are less than 30 microns in diameter, and none are over 50 microns in diameter. Obviously, sprays which do not exactly conform to this specification may be more or less suitable as space sprays. The definition is only a technical one and does not necessarily define all effective space sprays. It is quite apparent, for example, that a particular insecticide may be so effective that it will control flying insects when dispensed in a spray which does not exactly fit the definition. The definition does, however, represent a practical goal to be obtained. Moreover, as will be appreciated by one skilled in the art, these space sprays are substantially different from the coarse sprays such as surface sprays which are characterized by a substantial particle drop-out with a corresponding wetting of the surface over which it is sprayed. For example, if a space spray is sprayed 12 inches above a surface and the spray pattern is essentially parallel to said surface, in an atmosphere substantially free from the movement of air, said surface will be substantially free from wetting directly after spraying whereas, a surface spray under similar conditions would produce substantial wetting of the surface, directly after spraying.

One method of producing sprays having particles which will remain suspended for the desired period of time is by utilization of a two-phase system. In this system, the composition sealed in the container contains only two phases, the liquid phase and the gaseous phase. The liquid phase comprises the propellant, the active ingredients and solvent. The propellant is a normally gaseous liquid, that is, a substance which is gaseous at standard atmospheric conditions, but liquid under moderate pressure, isobutane and difluorodichloromethane, for example. Mixtures of propellants are often used. The choice of solvent will depend upon the active solute, the type of propellant, and end use of the product. Naturally, the liquid ingredients must be mutually soluble. The gaseous phase comprises, as the major ingredient, vapors of the propellant or propellants and may contain minor amounts of vapors from other ingredients in the liquid phase, for example, kerosene vapors, petroleum ether vapors or naphtha vapors, if these are used as solvents. These vapors make a minor and insignificant contribution to the force which propels the ingredients of the container. This force arises from the vaporization of the propellant which, as pointed out above, is normally gaseous.

For the utilization of these two-phase systems, and in fact for utilization of any self-propellant composition, the container is provided with a suitable valve mechanism for venting the pressurized system to the atmosphere. The valve is usually hand operated and carries a dip tube extending into the liquid phase. In its most simple form, the valve will have two orifices which are substantially opened at the same time by moving a suitable button. One orifice opens to the dip tube and the other to the atmosphere. On actuation of the valve, pressure arising from the vaporization of the propellant forces the liquid phase up the dip tube and into the atmosphere. When the propellant reaches the atmosphere, it vaporizes practically instantaneously and with almost explosive force, thus breaking the liquid stream into a large number of small droplets. As would be expected, with this system, the size of the droplets is decreased by increasing the amount of the propellant.

A two-phase system such as that described above has a number of disadvantages. Perhaps the most important of these, in terms of government regulations, is the danger of fire or explosion from venting large amounts of hydrocarbon propellant into the atmosphere, along with flammable active ingredients or solvents therefor. A secondary disadvantage is the necessity of utilizing comparatively large amounts of propellants, and using those which are normally quite expensive if not flammable.

Effective volatilization of the two-phase system can be considerably enhanced by providing a valve with a mechanical break-up outlet. The procedure is well known in the art. It merely involves providing the orifice which vents to the atmosphere, hereinafter called the "exit orifice," with a mechanical obstruction so that the liquid stream coming from the dip tube is broken into a plurality of smaller streams before reaching the atmosphere. The mechanical break-up outlet aids somewhat, but does not completely overcome the disadvantages of the two-phase system referred to above.

An alternative to the two-phase system is the three-phase system in which the composition in the container consists of three phases: a gaseous phase, a liquid propellant phase and an aqueous phase. As with the two-phase system, the gaseous phase comprises vapors of the propellant or propellants as the major component. The liquid propellant phase comprises as the major component, a normally gaseous hydrocarbon or halogenated hydrocarbon or a mixture of these. The aqueous phase contains the active ingredients and co-solvents, such as alcohol, deemed necessary to dissolve the active ingredients.

In the three-phase system, the propellant may float on the top of the aqueous phase or the reverse may occur, depending upon the specific gravity of the two liquid phases. It is undesirable for the propellant to be on the bottom because this necessitates frequent shaking or shortening the dip tube so that the dip tube does not extend to the lower liquid phase in order to avoid as much as possible the danger of having only propellant discharged through the valve. Shortening of the dip tube introduces economic problems since it is not possible to discharge all of the active ingredient. It is apparent, therefore, that in the ideal three-phase system, the propellant will be the upper layer.

The three-phase system described above is normally not capable of producing space sprays. That is, when the system is functioning correctly, only the aqueous phase is forced up the dip tube and into the atmosphere. Hence, the explosive force caused by vaporization of propellant does not occur and the aqueous phase is emitted as a fine stream or a course spray, i.e., surface spray, rather than as a fine spray, i.e., a space spray.

Two methods have been used heretofore for alleviating this situation; one is frequent shaking, the other is the use of a vapor tap valve. The former expedient is far from satisfactory. By shaking, the two liquid phases are mixed so that some propellant in the mixture is forced out of the dip tube. However, since the liquids are immiscible, they quickly separate and the system reverts to its former state. The vapor tap valve is more satisfactory especially when utilized in conjunction with a mechanical break-up outlet.

The vapor tap valve is well known in the art. Essentially it is formed by adding to the standard valve a mixing chamber interposed between the dip tube and the exit orifice. The mixing chamber is provided with an orifice leading to the vapor phase. Thus, when the vapor tap valve is actuated, some of the vapors from the gaseous phase enter the mixing chamber where they mix with the liquid forced up from the dip tube. The resultant mixture is vented through the exit orifice.

The combination of the vapor tap valve and mechanical break-up outlet, coupled with shaking, markedly decreases the size of the spray droplets. It does not, however, completely solve the problem.

One of the difficulties is that since some propellant is vented into the mixing chamber, it is necessary to control carefully the amount of propellant present in the container so that there is always enough to perform the major function, that is, the forcing of the aqueous component up the dip tube. The problem is even more acute if a mixture of propellants is used. Obviously, the more volatile constituent will be selectively bled into the mixing chamber so that with continued use the relative proportion of the two propellants will vary. Furthermore, mechanical mixing of the propellant vapor and the liquid phase in the mixing chamber of the vapor tap valve will not always accomplish the desired result. This is especially true with the more viscous liquids since these require large amounts of propellant to effect atomization. It is apparent that atomization is best effected by expelling some liquid propellant with the aqueous phase.

PRESSURIZED, SELF-PROPELLANT
COMPOSITIONS

It has now unexpecteldy been discovered that space sprays which are suitable as space deodorants, insecticides for flying insects, decongestants and other uses where the active ingredient must remain airborne for maximum effectiveness, can be obtained by using certain stable oil-out emulsions. This application is concerned with compositions containing these stable oil-out emulsions and with certain emulsifiers used to obtain these stable oil-out emulsions.

More particularly, this application is concerned with pressurized, self-propellant compositions comprising a stable oil-out emulsion, liquid propellant having a specific gravity less than said emulsion and gaseous propellant provided by volatilization of said liquid propellant, wherein at least some of said liquid propellant comprises a portion of the continuous phase of said emulsion.

For the purposes of the preesnt invention, oil-out emulsion is defined as an emulsion wherein the outer or continuous phase is oil and the inner or discontinuous phase contains water.

In defining the oil-out emulsion as stable, the accepted definition of the term stable is intended, i.e., designed, so as to develop forces that restore the original condition when disturbed from a static condition and not readily changing in physical state or properties. For example, it has been found that a substantial amount of the liquid propellant is retained as the continuous phase of the oil-out emulsion after prolonged periods of storage. The internal aqueous phase does not coalesce either upon standing or during agitation. Stable emulsions have been observed in certain compositions of the instant invention after 18 months of storage. That is, these compositions can be discharged as a fine spray from a container, without agitation, after being stored for 18 months indicating that the oil-out emulsion containing water, active ingredients, emulsifier and liquid propellant is available for discharge from the eductor tube. In addition, it has been found that the stable oil-out emulsions of the present compositions, when combined with separate liquid propellant wherein the propellant comprises at least a portion of the continuous phase of the emulsion, generally do not undergo phase-reversal, i.e., coalescence of the dispersed phase either before or after discharge when subject to conditions which would be expected to produce same. For example, it has been observed that, rather than undergo phase-reversal upon the incorporation of additional water into the dispersed phase, an oil-out emulsion is maintained which becomes extremely viscous. Such resistance to phase-reversal has been observed where water has comprised up to about 90 percent by weight of the composition. At these high concentrations of water, the compositions of the present invention tended to form gels, with a portion of water separating from the gel.

The coexistence in a pressurized, self-propellant composition of: (1) a separate liquid propellant; and (2) a stable oil-out emulsion, wherein the liquid propellant comprises the continuous phase of said emulsion is a novel and unique combination which unexpectedly and unobviously provides uniform and complete discharge of the pressurized composition after prolonged periods of storage and/or under a condition of continuous discharge; in either case, these results can be obtained with little or no necessity for agitation. A separate layer of liquid propellant is critical to the present invention in that it maintains the stable oil-out emulsion in a charged condition. That is, the separate liquid propellant functions as a reservoir of propellant, emulsifier and, in some instances, active ingredients for the continuous phase of the stable oil-out emulsion and the gaseous propellant phase. If all the liquid propellant is present as an oil-out emulsion, replenishing the gaseous propellant in the head space in the container which has been exhausted through the vapor tap orifice, would require escape of liquid propellant from the emulsion.

The stable oil-out emulsion, separate liquid propellant and gaseous propellant phases of the composition can be readily mixed by agitation. When the agitation stops, the three phases begin to separate. The gaseous propellant quickly separates from the liquid phase. Unlike the gaseous phase, separation of the immiscible liquid propellant phase from the oil-out emulsion is time dependent. That is, the less dense liquid propellant rises through the oil-out emulsion phase to form a discrete layer of a separate liquid propellant at the gas/liquid interface. For example, shortly after agitation ceases, i.e. after about 30 to 60 seconds, a discrete thin layer of propellant can be seen at the gas/liquid interface. The thickness of the propellant layer increases as more liquid propellant molecules rise through the oil-out emulsion phase. A substantial increase in the thickness of the propellant layer is seen one hour after shaking. However, one hour after shaking the liquid propellant/oil-out emulsion interface is not sharply defined. It is suggested that migration of the liquid propellant and oil-out emulsion components into their respective layers is continuing.

Twenty-four hours after agitation the system is essentially static with respect to separation into the three phases. That is, a sharp line of demarcation defining the liquid propellant/oil-out emulsion interface is observed. When observed under conditions free from disturbance after prolonged periods of storage, the three phases were observed to maintain a similar condition of separation.

When in a stratified condition, the three phases are in equilibrium. That is, the gaseous phase is in equilibrium with the liquid propellant phase. The liquid propellant phase is in equilibrium with the oil-out emulsion. Accordingly, therefore, the separate liquid propellant (the propellant is present in excess of the amount which can be emulsified) functions as a reservoir of propellant for the gaseous phase and for the continuous phase of the oil-out emulsion.

In a preferred embodiment of the invention, the stable oil-out emulsion consists essentially of water, liquid propellant, active ingredients and emulsifier. In a particularly preferred embodiment of the invention, the liquid propellant is a normally gaseous propellant at atmospheric pressure such as hydrocarbon and halogenated hydrocarbon propellants and mixtures thereof, and the emulsifier contains an ethoxylated, long-chain, fatty acid such as described below. In another embodiment of the invention, the propellant will contain a hydrocarbon diluent such as odorless mineral spirits, kerosene, naphtha, and the like.

OIL-OUT EMULSIFIERS

Only those emulsifiers which produce the stable oil-out emulsions described above can be successfully utilized in the practice of this invention. These stable oil-out emulsions require that a substantial portion of the propellant be retained as the continuous phase under essentially all conditions ranging from frequent agitation to remaining static over prolonged durations. In addition, the emulsifier must assure that the requisite rapid expansion of the emulsion takes place upon discharge from the container. The emulsifiers suitable for the present invention manifest very low solubility in water and good solubility in most non-polar solvents at room temperature. Emulsifiers which have been found especially suitable for the practice of this invention include mixtures of commercially available oil-out emulsifiers such as various Emcol and Span compositions with certain ethoxylated, long-chain fatty acids.

These ethoxylated, long-chain fatty acids have been found to be unexpectedly effective for producing stable oil-out emulsions of the invention. These ethoxylated, long-chain fatty acids are particularly effective where the pressurized composition is to be used as a pesticide such as an insecticide or the like. Heretofore, it has been difficult to obtain bioassay results in pressurized aqueous base insecticide compositions comparable to that obtained with pressurized oil-base insecticides. In addition, many of the commercially available oil-out emulsifiers are phytotoxic towards plants, which limits their use in insecticides and similar compositions. Unexpectedly, it has been found that the herein described ethoxylated long-chain fatty acid ester emulsifiers produce bioassay results with pressurized aqueous-base insecticide compositions comparable to those obtained with oil-base insecticides. In addition, these emulsifiers are non-phytotoxic at these concentrations.

Certain ethoxylated, long-chain fatty acid compounds which are useful as emulsifiers can be defined by the following formula:

Long-chain, fatty acid moiety    Ethoxy$_X$ H    (I)

wherein X has a value of from about one to about four and represents the average number of ethoxy groups, i.e., —CH$_2$—CH$_2$—O—, present per long-chain, fatty acid moiety. Typical long-chain fatty acids which would be included in the above formula are: oleic, stearic, palmitic and lauric acid. Ethoxy, in the foregoing formula, represents the organo radical (—CH$_2$—CH$_2$—O—) derived from ethylene oxide. When X in the above formula approaches a value of about five, the emulsifier tends to become water soluble. Although ethoxylated, long-chain, fatty acids where the ratio of the fatty acid moiety to ethoxy groups approaches one are useful, it has been found that optimum emulsifying performance is obtained where the ratio is from between about 1:3 to about 1:4 and preferably about 1:3.5. For example, optimum bioassay is obtained with various pesticide compositions of the present invention wherein X in the emulsifier has a value of about 3.5. The above formula shall be referred to hereinafter as Formula I.

A particularly preferred emulsifier is the polyoxyethylene glycol ester of stearic acid, i.e., the reaction product represented by the formula:

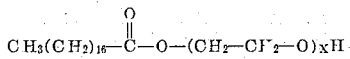

wherein X has a value of about 3.5. The value of X represents the average number of ethoxy groups in the reaction product per acid moiety and is based on the mole ratio of acid to ethylene oxide reacted. In a preferred embodiment of the invention, one mole of stearic acid and 3.5 moles of ethylene oxide are reacted to completion to produce the polyoxyethylene glycol ester of stearic acid. It is understood, of course, that the reaction product of a long-chain, fatty acid and ethylene oxide will comprise molecules wherein the number of ethylene oxide groups per acid molecule will range from one to greater than five; however, the value of X is based on the mole ratio of the reactants in the reaction product, where the reaction is continued substantially to completion.

As discussed above, the emulsifiers of Formula I are suitable when used alone in the compositions of the invention, however, in a preferred embodiment, the stable oil-out emulsion of the invention includes a combination of the ethoxylated, long-chain, fatty acids of Formula I and certain compatible, commercially available oil-out emulsifiers. Examples of the latter include Span 20 (sorbitan monolaurate) and Emcol 14 (polyglycerol oleate).

The ratio of the ethoxylated, long-chain, fatty acid emulsifier to the commercially available oil-out emulsifier can range from about 3:1 to about 1:1. The commercially available oil-out emulsifiers do not perform satisfactorily for the purposes of the present invention in the absence of the Formula I emulsifier. However, the combination of the ethoxylated long-chain fatty acid emulsifier of Formula I with certain commercially available oil-out emulsifiers does produce unobvious and unexpected results, i.e., improved bioassay, when employed in certain pressurized pecticide compositions of the invention. Unexpectedly, it has been found that similar results cannot be obtained with combinations of various commercially available oil-out emulsifiers.

At concentrations of ethoxylated, long-chain, fatty acid emulsifier above about 3.0 percent by weight, the compositions of the invention will contain stable oil-out emulsions. These compositions do provide satisfactory spray characteristics upon discharge; when the active ingredient is a pesticide such as an insecticide, an unsatisfactory bioassay is obtained. However, when the concentration of the ethoxylated, long-chain, fatty acid is maintained between about 0.3 and about 1.5 percent by weight unexpected and unobvious improvements in the spray characteristics and bioassay performance of certain pesticide compositions are obtained. When the concentration of ethoxylated, long-chain, fatty acid is substantially less than about 0.3 percent by weight, a stable oil-out emulsion as defined above cannot be consistently produced, and in order to effectively dispense this composition, continuous shaking is required. However, when the concentration of the ethoxylated, long-chain, fatty acid is at least about 0.38 percent by weight and the concentration of the commercially available oil-out emulsifiers such as Span 80 is 0.24 percent by weight, a satisfactory stable oil-out emulsion is obtained which performs effectively as a pesticide upon discharge. It is thought that the criticality in the concentration of the Formula I emulsifier is due at least in part to the "rigidity" of the emulsion produced. That is, at concentrations of about 2.0 percent by weight, the Formula I emulsifier produces a very rigid emulsion which does not tend to break up with the explosive force desired upon discharge, resulting in less desirable spray patterns and poor bioassays. When less than about 0.3 percent by weight of the Formula I emulsifier is used, the resultant emulsion is not sufficiently rigid and required frequent shaking to discharge some of the liquid propellant with the aqueous phase. It is understood that in compositions where spray patterns are not critical that the concentration of the Formula I type emulsifier can be increased above about 2.0 percent by weight. For example, more than 3.0 percent by weight emulsifier can be used in certain pesticides such as fungicide, miticide, and bactericide formulations. The total emulsifier concentration in certain of these compositions is often dictated by economics.

Of course, it is understood that the value of X in Formula I and the ratio of the Formula I emulsifier to the commercially available emulsifier will also influence the concentration of emulsifier employed.

Suitable commercially available oil-out emulsifiers are limited to those compatible compositions which are effective over prolonged periods of time, i.e., at least up to 18 months. As discussed above, it is critical to the present invention that the stable oil-out emulsion of the instantly claimed compositions be maintained for prolonged periods of time in order to insure optimum performance. The ethoxylated, long-chain, fatty acid emulsifiers described above have been found to exhibit the requisite effectiveness even after long periods of storage. Certain of the above-discussed commercially available oil-out emulsifiers including the Emcol and Span emulsifiers when in combination with the Formula I emulsifier have been found to be satisfactory.

These commercially available oil-out emulsifiers must be compatible with the Formula I emulsifiers. That is, they should not adversely affect the emulsifying properties of the latter compositions. For example, 0.3 percent stearyl dimethyl benzyl ammonium chloride (Ammonyx 4002) was combined with 1.05 percent polyoxyethylene glycol ester of stearic acid wherein X had a value of about 3.5. A water-out emulsion resulted which produced a foamy (water-out) spray upon discharge. Due to the poor spray pattern, the composition was not tested for bioassay. 0.4 percent Sandrol-200S (a stearic acid derivative from an alkanol amide) was combined with 1.1 percent of the polyoxyethylene glycol ester of stearic acid. A water-out emulsion resulted. Obviously, neither of the foregoing would be suitable for the present invention. In the foregoing all percentages are by weight.

Other substances may be present in the oil-out emulsion including perfumes, sanitizers, insect repellents and the like. These ingredients which may be used alone but are often combined may be generally classed as active ingredients. Typical insecticides include pyrethrins and their synergists such as piperonyl butoxide, chlordane, lindane, dieldrin, allethrin, thanite, DDT and others. Certain of these also function as miticides. Because of unpleasant odors, it is often desirable to mask insecticides with perfumes. Perfumes include a large class of chemical mixtures and compounds which excite a pleasing sensation on contact with the olefactory receptors. These include acids, esters, acetals, ketones, ethers, phenols, amines and others. The selection of a particular perfume or mixture of perfumes for use in a composition of this invention will depend upon the effect which it is desired to achieve. Any of a large number of perfumes and mixtures thereof may be successfully employed with or without other active ingredients. Among the insect repellents which may be successfully utilized in this invention, N,N-dimethyl-m-toluamide may be mentioned by way of example. Conventional sanitizers such as propylene glycol or triethylene glycol may be utilized in limited concentrations. As aforementioned, the identity of particular active ingredients will depend upon the intended use of the finished product as, of course, will the amount of each active ingredient.

PROPELLANT

The propellants used in the practice of this invention are the propellants ordinarily utilized in the manufacture of aerosol compositions which are liquifiable under normal use conditions. They include hydrocarbon and halogenated hydrocarbon propellants such as propane, butane, isobutane, isopentane, dichlorodifluoromethane, difluoroethane and tetrafluoroethane. Most halogenated hydrocarbons have a specific gravity which is higher than water. In the practice of this invention, these propellants will be diluted with unsubstituted hydrocarbons such as naphtha to obtain a propellant layer which floats on top of the aqueous layer. Even with a halogenated hydrocarbon, such as difluoroethane, which is less dense than water but exerts an especially high vapor pressure, it is sometimes desirable to dilute the propellant with unsubstituted hydrocarbons such as naphtha. Mixtures of propellants will often be employed to decrease the vapor pressure within the container to safe limits. Some halogenated propellants exert such a high pressure that safety becomes a problem especially at high ambient temperatures.

The amount of propellant used will depend upon a number of factors, as is well known. With a fairly viscous aqueous phase or when the valve orifices are unusually large, a greater amount of propellant will be employed than with less viscous aqueous phases and smaller orifices. It is, of course, desirable to utilize sufficient propellant to spray all of the aqueous phase containing the active ingredient bearing in mind that some of the propellant will be lost through the vapor tap. Generally speaking, the propellant will amount to from about 20 percent to about 60 percent by weight of the total composition. Smaller amounts may be employed with aqueous compositions of low viscosity and this may contribute to lowering the cost of the total composition. Alternatively, with viscous compositions, or if it is desired to eject fairly large amounts of propellant to assure the attainment of very small droplets, larger amounts of propellant may be used. However, the propellant contributes significantly to the cost of the composition and it is generally preferred to use the minimum amount which can be effectively utilized. In preferred formulations from about 25 percent to about 35 percent by weight of propellant based on the weight of the total composition will be used.

It is to be understood that various diluents such as naphtha, odorless mineral spirits, kerosene and chlorothene (1,1,1-trichloroethane) can be included with the propellant. In a preferred embodiment of the invention, odorless mineral spirits are combined with Freon 12 to provide a composition having a Tag open cup flash point above 100° F. (i.e., 122° F.). Similarly, chlorothene can be used as a diluent, however, the resultant propellant composition would be heavier than the emulsion and, accordingly, chlorothene is used in combination with hydrocarbons such as odorless mineral spirits. The use of propellant diluents is particularly important where various local and federal fire and shipping regulations are to be complied with. The concentration of propellant diluent employed will often be dictated by the particular propellant(s) employed. Generally, however, from about 1 percent to about 25 percent by weight diluent will be used and preferably from about 5 to about 15 percent by weight diluent.

VALVING

The practice of this invention contemplates the use of a vapor tap valve with a mechanical break-up outlet. Both of these are standard and well known in the art. The valve which is sealed in the container to produce a closed system comprises a premixing chamber and a secondary mixing chamber. The premixing chamber has two orifices. The first is a body orifice in cooperative engagement with a dip tube so that the emulsified liquid coming up the dip tube passes through the orifice and into the mixing chamber. The second is a vapor tap orifice communicating with the vapor phase of the system so that propellant vapor passes into the premixing chamber where it mixes with the liquid from the dip tube. The mixture thus produced passes then into the secondary mixing chamber. The secondary mixing chamber has two orifices, a stem orifice and an exit orifice. The stem orifice communicates with the premixing chamber so that mixed liquid and propellant vapors pass readily into it. The exit orifice communicates with the atmosphere and is constructed with a mechanical obstruction so that the mixture coming from the secondary mixing chamber is broken up into a plurality of streams. An exit orifice having a mechanical obstruction is referred to herein as a mechanical break-up outlet.

When a vapor tap valve is employed it is particularly advantageous to have separate liquid propellant in the self-propellant composition of the invention. For example, this separate propellant, which has a specific gravity less than the stable oil-out emulsion, provides a ready source of propellant which can be volatilized and thereby maintain the gaseous propellant phase in a charged condition. In contrast, if the entire liquid composition were emulsified, the liquid propellant required to maintain the gaseous propellant phase in a charged condition would have to escape, i.e., volatilize, directly from the emulsion. This latter condition is usually not satisfactory.

Referring now to the size of the various orifices, the body orifice may be from about 0.013 to about 0.100 inch in diameter. The stem orifice is from about 0.01 to about 0.03 inch in diameter. The vapor tap orifice is from about 0.01 to about 0.03 inch in diameter and the mechanical break-up outlet is from about 0.012 to about 0.025 inch in diameter. Certain compositions such as those containing a halogenated hydrocarbon propellant (Freon 12) and a diluent, such as naphtha, along with active ingredients, emulsifiers and water, do not require a vapor tap valve and, accordingly, conventional valves and stems, i.e., 0.013 inch stem and body, are employed.

Obviously, a fair amount of latitude is possible in the valving of a container of this invention, but some generalizations may be made. The body orifice is generally equal to or larger in size than the stem orifice and generally larger than the vapor tap orifice. The mechanical break-up outlet is preferably smaller than the body orifice. An especially useful valving system is one in which the body and stem orifices are both 0.025 inch in diameter, the vapor tap orifice 0.013 inch in diameter, and the mechanical break-up outlet 0.016 inch in diameter. This preferred valve assembly produces excellent results with respect to size of the droplets in the spray.

SPRAY PATTERNS

The hermetically sealed self-propellant, stable oil-out emulsions of this invention are substantially free of de-emulsifiers such as alcohol and when sprayed through a vapor tap valve having a mechanical break-up outlet produce non-flammable space sprays in which substantially all of the component particles remain airborne for an extended period of time, that is, for a sufficient length of time to efficiently accomplish the desired effect. Furthermore, since these compositions contain oil-out emulsions which are stable for prolonged periods, i.e., up to 18 months and longer, space sprays, as defined supra, can be produced even if spraying is resumed several days after the original shaking and/or under continuous spraying conditions. The spray performance of these compositions is an extremely important feature of the present invention. Many prior art attempts at space sprays have produced sprays in which fine particles exist only during the first few seconds of the spraying. The spray then reverts to one containing a substantial concentration of larger particles which, because of their larger size, settle almost immediately producing a wet surface in the area sprayed. The difference can be readily appreciated by spraying in front of a light source. It will be seen that sprays produced using a composition of this invention appear to float in the air, are mist-like, and persist as mist-like sprays even under substantially continuous spraying conditions, i.e., for up to five minutes or even more. In prior art sprays, there may be an initial surge of spray in which the particles are similar to the sprays of this invention, however, the spray usually quickly reverts to that of a surface spray in which many of the particles start to settle immediately. This usually occurs in the absence of continued agitation, over prolonged periods of continuous discharge, and/or during the discharge of the final portions of the product. It is believed that a major factor contributing to the inadequacy of most prior art space sprays is the presence of alcohols in the aqueous phase, and/or the absence of a stable oil-out emulsion. Generally, in the presence of alcohol, a known de-emulsifier, emulsions which are formed when the container is shaken prior to actuation tend to break up almost immediately with the result that only limited amounts of propellant are dispensed through the eductor tube along with the aqueous phase and the explosive force necessary to produce and to continue to produce particles of a size sufficient to remain airborne is not present. The emulsions of this invention are sufficiently stable so that propellant is continuously dispensed through the eductor tube as well as the vapor tap to produce airborne particles during spraying cycles of long duration, and also upon discharge without agitation.

The sprays of this invention, despite the presence of large amounts of propellant, are essentially non-flammable when tested in accordance with standard methods. They may, for example, be sprayed into an open 55 gallon drum in which there is a burning taper without evidence of flame propagation. There is no explosion when the drum is closed. The absence of alcohol contributes markedly to this effect. Another factor to be considered in the matter of flammability is the rate of discharge of the composition from the pressurized container. Compositions exemplified herein produce discharge rates which are generally less than 0.6 gram per second. Higher rates may sometimes produce positive drum tests, depending upon the nature of the propellant system. The only minimum rate of discharge for the compositions of this invention is dictated by the practical consideration of dispensing sufficient active material to accomplish the intended purpose within the time which a person normally actuates a pressure package. For example, if an average person depresses the actuator button for a period of about ten seconds, there will usually be sufficient pesticide or perfume dispensed in that period to kill the insect or mask the odor.

The following examples are given by way of illustration only and are not intended as limitations of this invention, many apparent variations of which are possible without departing from the spirit and scope thereof.

*Example 1*

A polyethoxylated, long-chain fatty acid of Formula I can be prepared as follows:

648 grams of stearic acid is placed in a reaction vessel along with 1.3 grams of sodium acetate catalyst. The reaction vessel is then put under a pressure of 3 inches of mercury and placed on a balance along with a heating bath. The stearic acid catalyst mixture is agitated and maintained at 160° C. for a period of six (6) hours during which time 352 grams of ethylene oxide are introduced into the vessel at the rate of reaction. The pH of the reaction product upon completion of the reaction is about 8 and is reduced to about 6 by washing the product with an acetic acid solution, thereby removing the sodium acetate catalyst.

The total weight of the reaction product is approximately 1,000 grams indicating a yield of almost 100 percent of a polyethoxylated stearic acid. The reaction product contains 3.5 moles of ethylene oxide per mole of stearic acid.

It is apparent from the foregoing that optimum performance can be obtained at total emulsifier concentrations of slightly greater than 0.60. Moreover, at a concentration of 0.7 percent polyoxyethylene glycol ester of stearic acid and 0.24 percent sorbitan monooleate, the composition was more effective than when twice the concentration of each was used.

C

Additional insecticide compositions similar to those described in B were prepared using various commercially available emulsifiers rather than the Formula I emulsifier. These compositions did not produce satisfactory bioassays. For example, compared to the insecticide described in B1, these compositions performed as follows:

| Emulsifier | Spray Pattern | Emulsion | Knockdown in minutes | | |
|---|---|---|---|---|---|
| | | | 5 | 10 | 15 |
| Ethoxylated Stearyl cetyl alcohol (Siponic E-1). | Good | Oil-Out | −7 | −17 | −15 |
| Polyoxyethylene lauryl ether (BRIJ 30). | Poor (Foam) | Water-Out[1] | | | |
| Polyoxethylene Stearyl Amine (Ethomeem 18/12). | Coarse | Oil-Out[1] | | | |
| Diglycol oleate/amine polyglycol. | do | do[1] | | | |

[1] Poor spray and, accordingly, not tested for bioassay.

*Example 2*

PESTICIDES

A

| | Percent by weight |
|---|---|
| Pyrethrins | 0.25 |
| Piperonyl butoxide | 1.25 |
| Fragrance | 0.10 |
| Sorbitan monooleate | 0.24 |
| Polyoxyethylene glycol ester of stearic acid [1] | 0.66 |
| Deionized water | 60.50 |
| Petroleum distillate | 1.00 |
| Isobutane | 32.00 |
| Dichlorodifluoromethane (Propellant 12) | 4.00 |
| | 100.00 |

[1] Approximately 42 percent of the reaction product is polyoxyethylene glycol and represents approximately 3.5 ethylene oxide moieties per acid moiety.

Valving

| | Inches |
|---|---|
| Body orifice | 0.025 |
| Stem orifice | 0.025 |
| Vapor orifice | 0.013 |
| Mechanical outlet | 0.016 |

B

Four similar insecticide compositions were formulated, only the concentrations of the polyoxyethylene glycol ester of stearic acid and sorbitan monooleate were modified. When tested against house flies in accordance with the standard Peet Grady procedure, the following bioassay results were obtained:

| | Percent by weight Polyoxyethylene glycol ester of Stearic Acid | Percent by weight Sorbitan Monooleate | Knockdown Compared to B1 | | |
|---|---|---|---|---|---|
| | | | 5 sec. | 10 sec. | 15 sec. |
| (B1) | 1.4 | 0.5 | | | |
| (B2) | .7 | 0.25 | 6 | 19 | 8 |
| (B3) | .35 | 0.12 | Not Tested [1] | | |
| (B4) | .38 | 0.24 | 0 | 6 | 4 |

[1] System requires continuous shaking to provide a suitable spray

Other pesticide compositions include:

INSECTICIDE-FUNGICIDE

D

| Component: | Percent by weight |
|---|---|
| Pyrethrins | 0.04 |
| Piperonyl butoxide | 0.20 |
| Vancide-89 (N - trichoromethylthiotetrahydrophthalimide produced by R. T. Vanderbilt) | 0.50 |
| Karathane (2.4-dinitro-6-(2-octyl) phenyl crotonate 22.5 percent—produced by Rohm & Haas, Philadelphia, Pa. | 0.25 |
| Polyoxyethylene glycol ester of oleic acid wherein there are about 3.8 moles of ethylene oxide per mole of oleic acid | 0.80 |
| Petroleum distillate | 0.16 |
| Water | 66.05 |
| Isobutane | 32.00 |
| | 100.00 |

Valving for the foregoing includes:

| | Inches |
|---|---|
| Body orifice | 0.030 |
| Vapor tap orifice | 0.013 |
| Stem orifice | 0.020 |
| Mechanical outlet | 0.016 |

FLYING INSECT KILLER

E

| Component: | Percent by weight |
|---|---|
| Allethrin (DL-2-alkyl-4 hydroxy-3-methyl-2-cyclopentanlone esterified with a cis and trans DL - chrysanthemum carboxylic acid, produced by Fairfield Chemical Div. Food, Machinery and Chemical Corp. New York, N.Y.) | 0.40 |
| Thanite T (Isobornyl thiocyanoacetate, produced by Hercules Powder Co., Inc. Wilmington, Delaware) | 1.00 |
| Piperonyl butoxide | 0.80 |
| Sorbitan monolaurate | 0.30 |
| Polyoxyethylene glycol ester of oleic acid wherein there are about 3.3 moles of ethylene oxide per mole of oleic acid in the reaction product | 0.70 |
| Water | 61.80 |

FLYING INSECT KILLER—Continued

| | |
|---|---|
| Isobutane | 32.00 |
| Propane | 3.00 |
| | 100.00 |

Valving for the foregoing composition includes:

| | Inches |
|---|---|
| Body orifice | 0.025 |
| Vapor tap orifice | 0.015 |
| Stem orifice | 0.020 |
| Mechanical outlet | 0.018 |

LIVESTOCK SPRAY

F

| Component: | Percent by weight |
|---|---|
| Allethrin | 0.10 |
| Repellent MGK-11 (2,3,4,5-bis (2 butylene) tetrahydrofurfural, manufactured by McLaughlin Gormley King Co., Minneapolis, Minn.) | 0.50 |
| Repellent MGK-326 (Di-n-propyl isocinch omerondee manufactured by McLaughlin Gormley King Co., Minneapolis, Minn.) | 0.50 |
| Polyoxyethylene glycol ester of lauric acid wherein there are about 3.4 moles of ethylene oxide per mole of lauric acid in the reaction product | 1.00 |
| Water | 69.90 |
| Isobutane | 28.00 |
| | 100.00 |

Valving for the foregoing composition includes:

| | Inches |
|---|---|
| Body orifice | 0.025 |
| Vapor tap orifice | 0.020 |
| Stem orifice | 0.025 |
| Mechanical outlet | 0.016 |

GARBAGE CAN SPRAY

G

| Component: | Percent by weight |
|---|---|
| DDT | 2.00 |
| Repellent MGK-11 (See Example 2F above) | 0.20 |
| Repellent MMGK-326 (See Example 3F above) | 0.20 |
| Perfume | 0.25 |
| Polyoxyethylene glycol ester of palmitic acid wherein there are 2.0 moles of ethylene oxide per mole of palmitic acid in the reaction product | 0.50 |
| Polyglycerol oleate | 0.20 |
| Water | 71.65 |
| Isobutane | 22.00 |
| Dichlorodifluoromethane | 3.00 |
| | 100.00 |

Valving for the foregoing composition includes:

| | Inches |
|---|---|
| Body orifice | 0.030 |
| Vapor tap orifice | 0.020 |
| Stem orifice | 0.020 |
| Mechanical outlet | 0.020 |

SPACE INSECTICIDE

H

| Component: | Percent by weight |
|---|---|
| Pyrethrins | 0.23 |
| Piperonyl butoxide | 2.00 |
| Perfume | 0.20 |
| Glycerol monostearate | 0.24 |
| Polyoxyethylene glycol ester of lauric acid wherein there are 3.7 moles of ethylene oxide per mole of lauric acid in the reaction product | 0.38 |
| Water | 65.95 |
| Butane | 24.00 |
| Propane | 7.00 |
| | 100.00 |

Valving for the foregoing composition includes:

| | Inches |
|---|---|
| Body orifice | 0.025 |
| Vapor tap orifice | 0.016 |
| Stem orifice | 0.025 |
| Mechanical outlet | 0.020 |

Example 3

AIR FRESHENERS

A

| Component: | Percent by weight |
|---|---|
| Perfume oil | 0.60 |
| Polyoxyethylene glycol ester of stearic acid wherein there are about 3.0 moles of ethylene oxide per mole of stearic acid | 1.40 |
| Water | 68.00 |
| n-Butane | 20.00 |
| Dichlorodifluoromethane | 5.00 |
| Naphtha | 5.00 |
| | 100.00 |

B

| Components: | |
|---|---|
| Perfume oil | 0.60 |
| Polyoxyethylene glycol ester of oleic acid wherein there are about 4.0 moles of ethylene oxide per mole of oleic acid | 1.00 |
| Propylene glycol stearate | 0.35 |
| Water | 48.05 |
| Odorless mineral spirits | 20.00 |
| Dichlorodifluoromethane | 30.00 |
| | 100.00 |

The suitable valving for the foregoing air freshener would include:

| | Inches |
|---|---|
| Body orifice | 0.060 |
| Stem orifice | 0.030 |
| Vapor tap orifice | 0.020 |
| Mechanical outlet | 0.017 |

Example 4

DECONGESTANTS

A

| Component: | Percent by weight |
|---|---|
| Menthol | 0.50 |
| Oil of eucalyptus | 0.15 |
| Polyoxyethylene glycol ester of palmitic acid wherein there are about 2.0 moles of ethylene oxide per mole of palmitic acid | 0.40 |
| Water | 58.95 |
| Isobutane | 30.00 |
| Odorless mineral spirits | 10.00 |
| | 100.00 |

B

| Component: | |
|---|---|
| Menthol | 0.50 |
| Oil of eucalyptus | 0.15 |
| Polyoxyethylene glycol ester or lauric acid wherein there are about 2.5 moles of ethylene oxide per mole of lauric acid | 2.00 |
| Sorbitan monopalmitate | 0.70 |
| Water | 66.65 |
| Isobutane | 30.00 |
| | 100.00 |

Valving for these decogestats could be similar to that suggested for the air freshener described in Example 3.

Products similar to the above insecticides, space deodorants, decongestants and the like can be prepared and utilized as miticides, bactericides, etc., by replacing the active components, i.e., insecticides, perfumes and decongestants with suitable pesticides including: miticides such as Aramite 2-(p-tertbutylphenoxy)-isopropyl 2-chloroethyl sulfite, Chlorbenzide, p-chlorobenzyl p-chlorophenyl sulfide, Chlorobenzilate, ethyl 4,4'-dichlorobenzilate, Kelthane, 1,1-bis(4-chlorophenyl)2,2,2-trichloroethanol and Zineb, zinc ethylenebisdithiocarbamate; nematocides such as Mylone, 3,5-dimethyl-1,3,5,2H-tetrahydrothiadiazine-2-thione, Tetrachlorothiophene, tetrachlothiophene and Vapam, sodium N - methyldithiocarbamate; rodenticides such as Endrin, 1,2,3,4,10,10-hexachloro-6,7-epoxyl-1,4,4a,5,6,7,8,8a-octahydro-1,4-endo, endo-5,8-dimethanonaphthalene and Warfarin, 3-(a-acetoxeylbenzyl)-4-hydroxy coumarin; fungicides such as Brestan, triphenyltin acetate, Captan, N-trichloromethylmercapto-4-cyclohexene-1,2-dicarboximide, Chloranil, tetrachloro-p-benzoquinone, Chlortetracycline, 7-chloro - 4 - dimethylamino - 1,4,4a,5,5a,6,11,12a - octahydro - 3,6,10,12,12a-pentahydroxy - 6 - methyl - 1,11 - dioxo-2-napthacenecarboximide, Folpet, N - trichloromethylthiophthalimide, Karathane, 2,4-dinitro-6-(2-octl)phenyl crotonate, Mylone, Nabam, disodium ethylenebisdithiocarbamate, Pentachlorophenol, 1,2,3,4,5-pentachlorophenol, 2,4,5-T, 2,4,5-trichlorophenoxyacetate, and 2,3,6–TBA, 2,3,6-trichlorobenzoic acid and herbicides such as Avadex, 2,3-dichloroallyl N,N-diisopropylthiolcarbamate, DNBP, 4,6-dinitro-o-secbutylphenol alkanol amine salts, Maleic hydrazide, 1,2-dihydro-pyredazine-3,6-dione, 2,4–D, 2,4-dichlorophenoxyacetic acid and Zytron, o-(2,4-dichlorophenyl) o-methyl N-(isopropyl) phosphoramidothioate.

What is claimed is:

1. A pressurized, self-propellant, pesticide composition consisting essentially of:
    A. a stable oil-out emulsion;
    B. liquid propellant having a specific gravity less than said emulsion;
    C. gaseous propellant provided by volatilization of said liquid propellant;
    D. pesticide; and
    E. from about 0.3 to about 1.5 percent by weight of a polyethoxylated long-chain fatty acid emulsifier having the general formula: [long-chain fatty acid moiety] [ethoxy]$_x$ H, wherein [long-chain fatty acid moiety] is selected from the group consisting of: oleic, stearic, palmitic, lauric acid and mixtures thereof, and [ethoxy] represents the ethoxy moiety (—CH$_2$—CH$_2$—O—) and $x$ has a value of from about 1 to about 4 and wherein:

(1) a portion of said liquid propellant comprises the continuous phase of said stable oil-out emulsion and the remainder of the liquid propellant forms a separate liquid layer floating above said stable oil-out emulsion;
   (2) said stable oil-out emulsion consists essentially of water, pesiticide, liquid propellant and a portion of said emulsifier; and
   (3) said liquid propellant is a normally gaseous propellant selected from the group consisting of hydrocarbon and halogenated hydrocarbon propellants and mixtures thereof.

2. A pressurized, self-propellant, pesticide composition according to claim 1 wherein the water comprises from about 35 to about 75 percent by weight of the composition; the propellant comprises from about 25 to about 60 percent by weight of the composition; and the pesticide comprises up to about 5 percent by weight of the composition.

3. A pressurized, self-propellant, pesticide composition according to claim 1 containing a mixture of the polyethoxylated long-chain fatty acid emulsifier with a compatible oil-out emulsifier selected from the group consisting of: sorbitan monolaurate, sorbitan monopalmitate, sorbitan monoleate, polyglcerol oleate, propylene glycol stearate, glycerol monostearate and mixtures thereof.

4. A pressurized, self-propellant composition according to claim 1, wherein X has a value of about 3.5.

5. An emulsifier composition according to claim 3 wherein the ratios of polyethoxylated long-chain fatty acid to the compatible oil-out emulsifier ranges from between about 3:1 to about 1:1.

References Cited by the Examiner

UNITED STATES PATENTS 3,159,535  12/1964  Sesso et al. _____ 167—39

JULIAN S. LEVITT, *Primary Examiner.*

SAM ROSEN, *Examiner.*

GEORGE A. MENTIS, *Assistant Examiner.*